United States Patent [19]
Fukutomi

[11] Patent Number: 5,842,132
[45] Date of Patent: *Nov. 24, 1998

[54] MOBILE TELECOMMUNICATION METHOD AND SYSTEM

[75] Inventor: Reijiro Fukutomi, Tokyo, Japan

[73] Assignee: Hitachi, Ltd., Tokyo, Japan

[ * ] Notice: The term of this patent shall not extend beyond the expiration date of Pat. No. 5,659,882.

[21] Appl. No.: 812,699

[22] Filed: Mar. 6, 1997

Related U.S. Application Data

[63] Continuation of Ser. No. 321,835, Oct. 6, 1994, Pat. No. 5,659,882.

[51] Int. Cl.[6] .................................................. H04B 1/00
[52] U.S. Cl. .......................................... 455/456; 455/12.1
[58] Field of Search .................................. 455/12.1, 422, 455/435, 517, 524, 456

[56] References Cited

U.S. PATENT DOCUMENTS 5,659,882 8/1997 Fukutomi ................................. 455/524

*Primary Examiner*—Nguyen Vo
*Assistant Examiner*—Marsha D. Banks-Harold
*Attorney, Agent, or Firm*—Antonelli, Terry, Stout & Kraus, LLP

[57] ABSTRACT

A mobile radio communication method and a mobile radio communication system arranged in which as to a personal station (PS) located in a moving object equipped with a personal base station (CS), a position is registered with respect only to CS within the moving object. In this communication system, a connector is provided which connects a personal station (PS) possessed by a rider of the moving object to CS within the moving object. The personal station (PS) connected to the connector issues a position register demand through the connector to CS within the moving object. Subsequently, this personal station periodically issues the position register demand only to CS within the moving object in the form of electromagnetic waves until the level of the electromagnetic waves transmitted from CS within the moving object becomes lower than a predetermined value. The personal base station (CS) accepts only the position register demand issued from PS connected to the connector. The personal base station (CS) within the moving object releases the position registration of the relevant PS when the transmission of the position register demand from the personal station whose position has been registered, is interrupted.

1 Claim, 5 Drawing Sheets ial radio station, in which at
MOBILE TELECOMMUNICATION METHOD AND SYSTEM This is a continuation of application Ser. No. 08/321,835, filed Oct. 6, 1994, U.S. Pat. No. 5,659,882.

BACKGROUND OF THE INVENTION

The present invention generally relates to a mobile telecommunication method and a mobile telecommunication system. In particular, the present invention concerns a personal communication system typically known as a portable telephone, capable of utilizing a public telephone network with employment of a personal radio station, in which at least subscriber line segments are formed in a radio signal form.

Nowadays, a mobile telephone system (cellular telephone) is utilized as a portable (pocket) telephone similar to a cordless telephone. This system has a problem in that as the number of subscribers is increased, it becomes a shortage of available electromagnetic waves. As one solution, the cells are made small to improve reuse rate of the electromagnetic waves. When the cells are made small, the switching operations from cells to cells should be frequently performed in the mobile telephone. In particular, when an automobile is driven along boundaries of the cells, proper telephone conversation could not be expected. Accordingly, there is a certain limitation to make the cells of the mobile telephone system small. As a consequence, there are independently available such a mobile telephone system having relatively large cells, and also such a cordless telephone system in which cell diameters are reduced up to approximately 100 meters, thereby increasing the frequency reusability.

However, although these systems are such telephone systems using radio signals, these telephone systems do not employ a common subscriber interface. Thus, users should possess (use) a terminal specific to the telephone system under use.

To solve the above-mentioned inconvenience, ITU-R (International Telecommunication Unit Radiocommunication Study Groups) has investigated such a system capable of utilizing any telephone system with employment of a single terminal.

That is, ITU-R has considered FPLMTS (Future Public Land Mobile Telecommunication System) corresponding to a radio interface. A concept of this FPLMTS system will be described with reference to a systematic diagram according to an embodiment of the present invention, as shown in FIG. 1.

In the drawing, reference numeral 1 indicates a portable telephone corresponding to a personal station (will be referred to as "PS" hereinafter). Reference numerals 20 to 25 (symbolized as "2") represent personal base station (will be referred to as "CS" hereinafter). Reference numerals 30 and 31 indicate mobile stations (will be referred to an "MS" hereinafter). Reference numeral 4 indicates a mobile base station (will be referred to as "BS" hereinafter). Reference numeral 5 shows a communication satellite. Reference numeral 6 denotes a mobile communication base station (will be referred to as "MES" hereinafter). Reference numeral 8A represents a wire line network involving a mobile communication switching (exchange) station (will be referred to as "MSC" hereinafter). Reference numeral 10 is a local switching (exchange) machine. Reference numeral 7 denotes a position register center. Reference numeral 8B is an existing network such as ISDN and PSTN.

Further, symbol R 2 indicates a radio interface between PS (personal station) 1 and CS (personal base station) 2, symbol R 1 shows a radio interface between MS (mobile station) 30 or 31 and BS (mobile base station) 4, and symbol R 3 denotes a radio interface between MES (mobile communication base station) 6 and the communication satellite 5.

As shown in this drawing, in the FPLMTS system, the radio interface for PS 1 and CS 2 is unified as R 1, so that various radio services such as mobile telephones, satellite telephones, and office cordless telephones are available by employing a single PS (personal station) 1.

It should be noted that in the FPLMTS system, a similar service is assumed when the radio interface R2 between PS 1 and CS 2 is the same as the radio interface R 1 between MS 3 and BS 4. However, as to the radio interface R 1 utilized in the mobile telephone, a radius of a cell in one BS 4 should be selected to be on the order of 0.5 to 20 km in order to avoid frequent switching operations of the cells. Then, if the radio interface R 1 is identical to the radio interface R2, then it may be assumed that a shortage of radio wave frequencies seriously occurs, because of the very wide cell radius of this BS 4. As to the personal base station CS 2, the cell radius of this CS 2 is selected to be approximately up to 100 m with respect to the radio interface R2 for the personal station PS 1, in which while a user probably, relatively stops or walks, he will use the portable telephone. As a consequence, it could be expected that the radio wave frequencies are effectively utilized. It should be understood that a cell is defined as a region or area covered by a single base station.

The FPLMTS system is described more in detail, in "Next Generation Portable Telephone System" (published by NIKKAN KOGYO Newspaper, supervised by the Ministry of Posts and Telecommunications, Mobile Communication Division).

As described above, in accordance with the FPLMTS system considered by CCIR, various services such as mobile telephones office cordless telephones, and portable telephones are available by way of a single personal station (PS) 1.

To this end, however, as illustrated in FIG. 8, in case that CS (personal base station) 24 on a moving object 100 corresponds to such CS located at the nearest position from PS 1A which is possessed by another subscriber outside this moving object, PS 1A requests CS 24 on the moving object to register its location. In this case, although the subscriber does not ride in the moving object, the location registration of this subscriber is carried out with respect to CS 24 on the moving object, and when the moving object is moved so that the distance between this moving object and the subscriber becomes longer, a telephone communication is interrupted. On the other hand, it is not always limited that PS 1B on the moving object utilizes PBS 4 via CS 2 on the same moving object. If PB 1B on the moving object utilizes CS 2 fixed on the ground, then the cell switching operations are very frequently performed in connection with movements of the moving object. Furthermore, if such an operating mode is allowed, then a large-scale control system would be required, resulting in practical problems.

In other words, to realize such a system that various services are available by employing a single terminal unit, like in the FPLMTS system, it is required to selectively provide the necessary service, depending upon user conditions of PS, especially such a condition as to whether or not the user is on a high-speed moving object.

SUMMARY OF THE INVENTION

Therefore, an object of the present invention is to provide a personal telecommunication method and system capable of selectively utilizing various services by way of a single personal station (PS), depending on conditions of the PS.

To achieve the above-described object, in accordance with a feature of the present invention, there is provided a personal communication system which includes: a plurality of personal stations; a fixed personal base station fixed on the ground, for relaying a call issued from the personal station to a mobile communication switching device; a mobile personal base station installed on a moving object, for relaying the call issued from the personal station to a mobile station; a mobile station for relaying the call relayed by the mobile personal base station to a base station via a radio interface R 1; a base station relaying the call relayed by the mobile station to the mobile communication switching device; a position register center managing positions of said respective personal stations; and a mobile communication switching device switching the calls among the respective personal stations in accordance with a management content of said position register center.

The personal station is connectable with any of said fixed personal base station and said mobile personal base station via a radio interface R 2.

The said mobile personal base station includes means for identifying the personal station present on the moving object where said mobile personal base station is installed; and means for registering a position about only a relevant personal station which is identified such that the personal station is present on the moving object, into the position register center in correspondence with said mobile personal base station.

According to another feature of the present invention, such a personal communication system is provided in which said personal station is connectable with any of the fixed personal base station and the mobile personal base station via a radio interface R 2, and includes means for identifying whether the personal station itself is present on the moving object where said mobile personal base station is installed; and means for registering the position of the personal station itself via only a mobile personal base station into the position register center when identification is made that the personal station is present on the moving object.

Furthermore, to achieve the above-described object of the present invention, such a personal communication system is provided in which the personal station is connectable with any of the fixed personal base station and the mobile personal base station via a radio interface R 2, and includes means for identifying whether the personal station itself is present on the moving object where the mobile personal base station is installed; and means for registering the position of the personal station itself via only a mobile personal base station into the position register center when identification is made that the personal station is present on the moving object; and the mobile personal base station includes means for identifying the personal station present on the moving object where the mobile personal base station is installed; and means for registering a position about only the personal station which is identified such that the personal station is present on the moving object, into the position register center in correspondence with the mobile personal base station.

In the arrangement with the above-described features, the position registration established to the mobile station is carried out based on the information containing the combination between the identification number of the personal station and the identification number of the moving station, and then the identification numbers are mutually convertible. With the above-described manner, when a telephone call is made to the personal station connected to the mobile station, a telephone caller merely recognizes only the identification number of the personal station, and does not need to recognize the identification number of the mobile station.

In accordance with the personal communication system of the feature of the present invention, the mobile personal base station identifies the personal station present on the moving object where this mobile personal base station itself is installed, and registers only the position of the personal station which is identified such that this personal station is present on the moving object in correspondence with itself. As a consequence, the position of the personal station located outside the moving object does not need to be registered in correspondence with the mobile personal base station which is moved together with the moving object.

Furthermore, the above-described mobile personal base station announces such a message that said mobile personal base station is present on the moving object, to the personal station which is identified by such that said mobile personal base station is present on the moving object; and said personal station registers the position of the personal station itself into said position register center via only such a mobile personal base station which has received the announcement such that said personal station is present on the moving object. Thus, the position of the personal station present in the moving object, which is moved together with the moving object, is not registered in correspondence with the fixed personal base station fixed on the ground.

According to another personal communication system of the present invention, the personal station identifies whether or not this personal station itself is present on the moving object where the mobile personal base station is installed, and also registers the position of said personal station itself via only a mobile personal base station into said position register center when identification is made that said personal station is present on the moving object. As a result, the position of the personal station located within the moving object, which is moved together with the moving object, is not registered in correspondence with the fixed personal base station fixed on the ground.

Furthermore, the personal station issues to a mobile personal base station, such a position register demand containing information indicating that said personal station is present on the moving object when it is identified that said personal station is present on the moving object, and the mobile personal base station registers the position into said position register center in correspondence with said personal station in response only to the position register demand containing the information indicating that said mobile personal base station is present in the moving object, which is issued from the personal station. Then, the position of the personal station located outside the moving object is not registered in correspondence with the mobile personal base station which is moved together with the moving object.

According to another personal communication system related to the present invention, the personal station identifies whether or not said personal station itself is present on the moving object where said mobile personal base station is installed; and registers the position of said personal station itself via only a mobile personal base station into said position register center when identification is made that said personal station is present on the moving object. The mobile personal base station identifies the personal station present on the moving object where said mobile personal base station is installed; and registers a position about only the personal station which is identified such that said personal station is present on the moving object, into said position register center in correspondence with said mobile personal base station. As a consequence, the position of the personal station present within the moving object, which is moved together with the moving object, is not registered in correspondence with the fixed personal base station fixed on the ground, and further the position of the personal station located outside the moving object is not registered in correspondence with the mobile personal base station which is moved in conjunction with the moving object.

The objects, features and advantages of the invention will become apparent from the following detailed description of the invention in conjunction with the accompanying drawings.

DESCRIPTION OF THE PREFERRED EMBODIMENTS

A description will now be made of a personal communication system according to an embodiment of the present invention.

Figure 1:
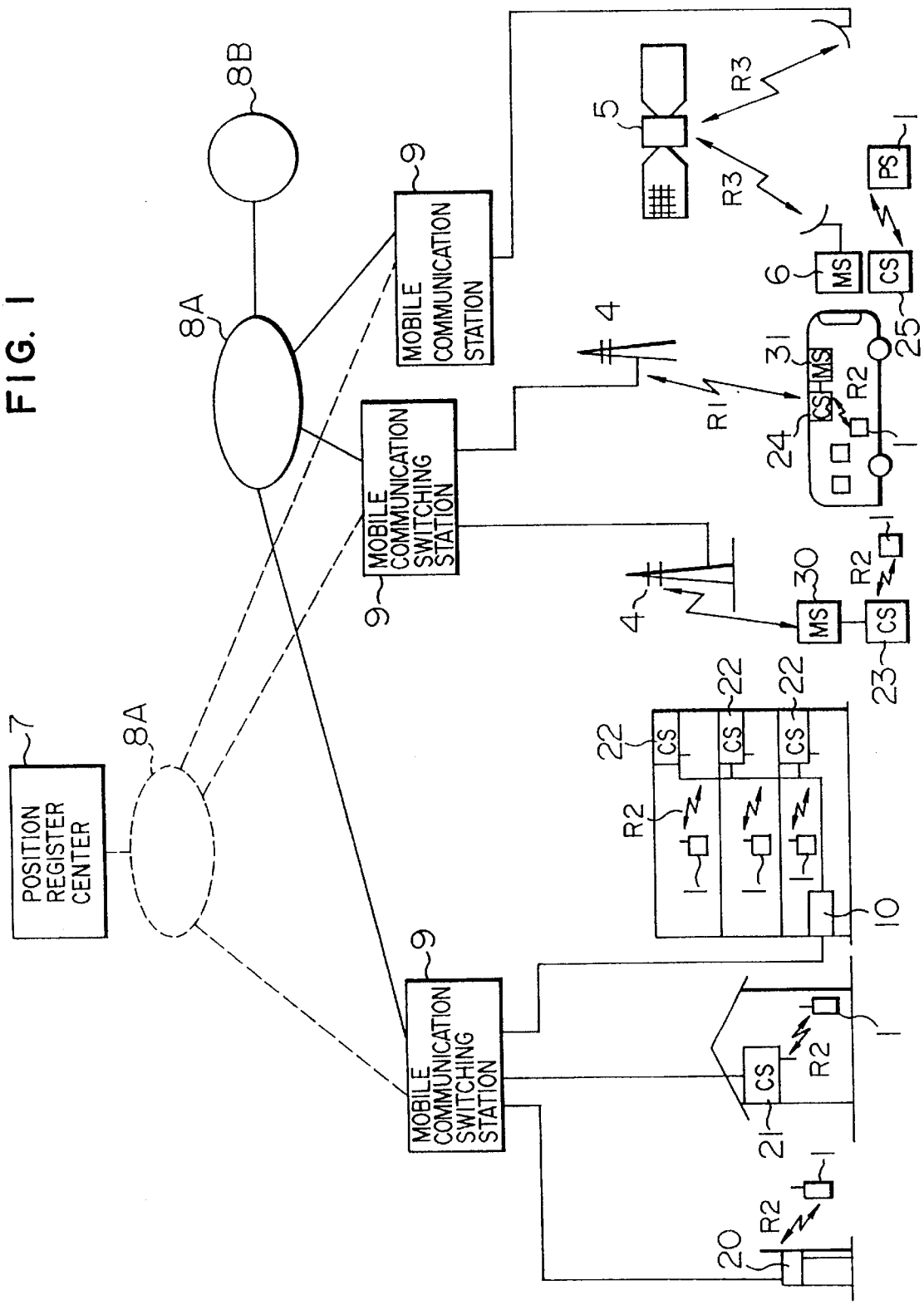
FIG. 1 is an explanatory diagram for representing an arrangement of a personal communication system according to an embodiment of the present invention.

FIG. 1 schematically indicates an arrangement of the personal communication system according to this embodiment.

In this drawing, reference numeral 1 indicates a personal station (will be referred to a "PS" hereinafter) corresponding to a portable telephone, and reference numerals 20, 21, 22, 25 show CS (personal base station) fixed on the ground, and further reference numeral 24 indicates CS mounted on a mobile. Reference numeral 10 is a local switching (exchange) machine, reference numeral 30 shows an MS (mobile station) fixed on the ground, which is set in a thinly populated area, and reference numeral 31 indicates an MS (mobile station) mounted on a mobile. Reference numeral 4 indicates a BS (mobile base station), reference numeral 5 shows a communication satellite, reference numeral 6 denotes an MES (mobile communication base station), reference numeral 9 represents an MSC (mobile communication switching station), reference numeral 7 is a position register center, and also reference numeral 8B shows an existing network such as ISDN and PSTN.

Further, symbol R2 shows a radio interface between PS 1 and CS 2, symbol R 1 indicates a radio interface between MS 3 and BS 4, and symbol R 3 denotes a radio interface between MES 6 and a communication satellite 5. In this embodiment, the radio interface R 1 is different from the radio interface R2.

In accordance with this embodiment, a radius of a cell for a single BS 4 is selected to be on the order of 0.5 km to 20 km, another cell radius of CS 2 is selected to be up to approximately 100 m, and a cell radius of the communication satellite 5 is determined in correspondence with the satellite under use. It should be noted that with respect to CS 24 installed within a moving object, a radius of the cell thereof is selected to be a minimum dimension by which the moving object can be covered.

Operations of the personal communication system according to this embodiment of the present invention will now be summarized.

Each PS 1 transmits a position registration demand to one of CS 20 through CS 25 periodically or every preselected timing, whose receiving signal level is the highest. It should be understood that in order to avoid busy conditions of the satellite line, when other CSs are usable, PS 1 does not send the position registration demand to CS 25, but transmit the position registration demand to other CSs. In this embodiment, the position registration by CS 20 to CS 24 is partially limited with regard to the moving object. The content and means of this limitation will be discussed later.

The personal base stations CS 20 to CS 24 having received the position registration demand register via MS 30, 31, MES 6, communication satellite 5, and MSC 9 into the position register center, such information that PS 1 which has transmitted the position register demand is present within the own cell. The mobile station MS 24 converts the radio interface R 2 between CS 23, 24 and PS 1 into another radio interface R 1. The mobile communication base station MES 6 converts the radio interface R2 between CS 25 and PS 1 into another radio interface R 3.

The mobile communication switching station which has received the telephone call issued from PS 1 via any one of CS 20 to CS 25, interrogates the position register center 7 about the position of the called PS 1, and sends a cal to such a personal base station CS in which the registered cell is loaded. The personal base station CS which has received this call, will call up PS 1. Subsequently, a communication is available in a similar manner to the normal telephone conversation.

Next, the position registration of PS 1 within the mobbing object will be explained.

As previously explained, PS 1 within the moving object must request to register the position with respect only to CS 24 located within the moving object. Also, PS 1 must request CS of the moving object to register the position thereof.

To this end, in this embodiment, a PS connector is provided either in a seat of such a moving object as a bus, a train, and an automobile, or in a proper position within the moving object, for example, a train telephone booth. This connector is such a connector to which PS 1 is connectable, and this connector for PS 1 is connected to CS 24 within the moving object.

Figure 2A:
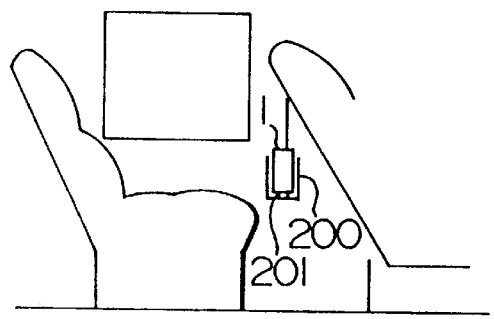
FIGS. 2A and 2B are explanatory diagrams for indicating PS connectors employed in a moving object.
Figure 2B:
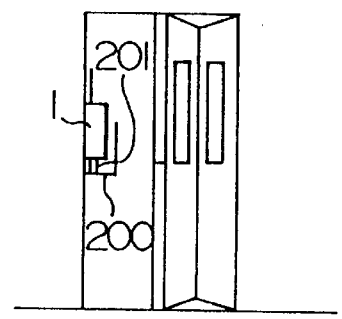

FIG. 2 illustrates a setting example of the connector. FIG. 2A indicates such an example that a pocket-shaped case 200 for storing PS is provided with each of seats of a moving object, e.g., a bus, a train, and an automobile. As represented in FIG. 2A, a connector 201 to be connected to PS 1 is provided within the case 200. FIG. 2B indicates such an example that a telephone booth is provided within a moving object such as a bus and a train, and a case 200 for storing PS 2 is provided within the telephone booth.

When PS 1 is connected to the connector, the PS 1 senses this connection and then transmits a position register demand via this connector. When PS 1 is disconnected from the connector, the PS 1 periodically transmits the position register demand only to CS 24 within the moving object by way of electromagnetic waves.

On the other hand, CS 24 within the moving object performs the position register process only for the position register demand received via the connector. As a result, identification number information of PS 1 is registered into the position register center 7 together with the identification number of MS 31 within this moving object.

As a result, CS 24 within the moving object may accept only the position register demand issued from PS 1 within the moving object. Also, the position register demand from PS 1 within the moving object is not issued to CS 20 located outside the moving object.

Figure 3:
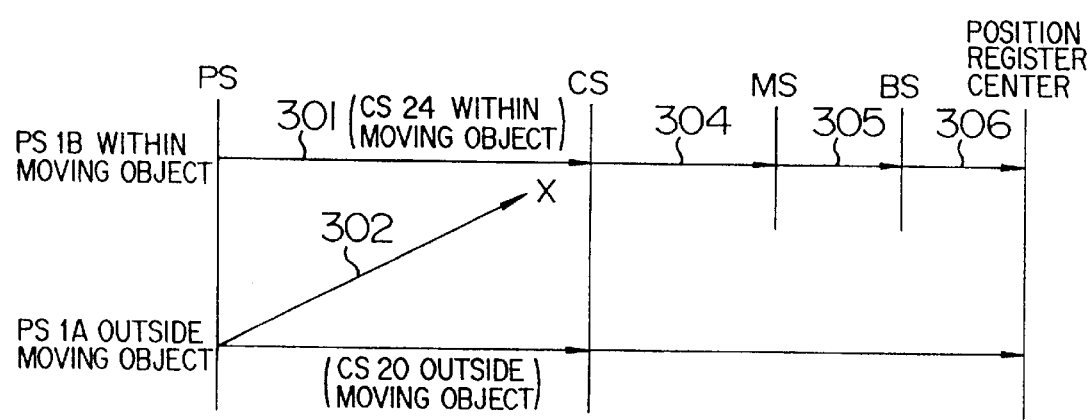
FIG. 3 schematically shows a sequential operation diagram of a sequence to register a first position with respect to PS within the moving object.

FIG. 3 is an illustration for explaining the above-described operations.

In FIG. 3, reference numeral 301 indicates the position register demand transmitted from PS 1 within the moving object via the connector to CS 24 within the moving object. This demand 301 is transmitted via MS 31 to BS 4 in the form of electromagnetic waves of the radio interface R 1, and is further sent to the position register center 7. Reference numeral 302 indicates another position register demand transmitted from the generic personal station PS 1 in the form of electromagnetic wave, which is received by CS 24 within the moving object. The personal base station CS 24 within the moving object does not perform the position register process as to PS 1 which transmits this electromagnetic wave.

Then, when the personal station PS 1B whose position has been registered via the connector with respect to CS 24 within the moving object, reaches a destination place, the personal station PS 1B gets off the automobile together with the possessor. As a result, the personal station PS 1B whose position has been once registered with regard to CS 24 within the moving object via the connector, transmits a position reregister demand by way of electromagnetic waves in a constant time period after this position registration. Then, in the personal base station CS 24 within the moving object, when the position reregister demand is issued in the form of electromagnetic waves from PS 1B previously registered in response to the demand 301, it is recognized as the riding PS. Conversely, at the time instant when there is no position register signal in the form of electromagnetic waves, it may be judged that this PS 1 gets off the automobile, so that the release process of position registration is carried out. On the other hand, the process operation of the personal station PS 1B is advanced to such a normal process that the position register demand is issued to the personal base station CS 20 on the ground, which receives the electromagnetic wave at the highest level, when the level of the electromagnetic wave sent from CS 24 within the moving object is weakened lower than a predetermined value.

The above-described restrictions of the position registration may be realized by the following procedure.

That is, such a key is provided with PS 1, by which a designation is made of the present location of the subscriber, for instance, locations within/outside a moving object, and within/outside an office. Then, it may be judged as to whether or not the personal station PS 1 is located within the moving object, or outside the moving object based upon the key operation by this subscriber.

Figure 4:
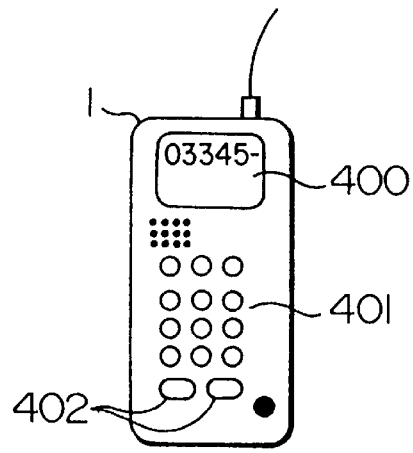
FIG. 4 schematically illustrates an outer appearance of PS equipped with a using position designating key.

In FIG. 4, there is shown an outer appearance of the personal station PS 1 equipped with such a key.

As shown in FIG. 4, this personal station PS 1 represents a portable telephone having a liquid crystal display 400 for displaying various information, a number enter key 401, and a using location designation key 402 for designating the present location of the subscriber.

Figure 5:
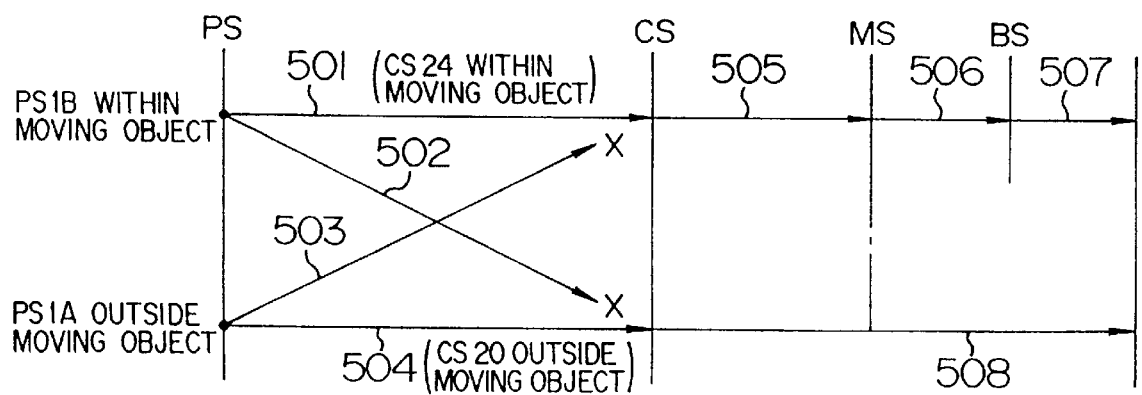
FIG. 5 schematically indicates a sequential operation diagram of a sequence to register a second position with respect to PS within the moving object.

As illustrated in operation explanation of FIG. 5, the subscriber getting on the moving object manipulates the using location designation key of PS 1. Accordingly, such a fact that the subscriber gets on the moving object is announced to PS 1. Upon receipt of this announcement, PS 1 transmits the position register demand while sequentially varying sending destination until such a position register demand containing an identification for identifying that PS 1 is mounted on the moving object (signal sequence 501). The personal base station CS 24 employed within the moving object accepts the position register demand when this riding identification information is contained in this position register demand, whereas CS 24 does not accept the position register demand when this riding identification information is not contained therein (signal sequence 503). The identification number information of PS 1 having accepted the position register demand, is transmitted together with the identification number of MS 31 within the moving object via MS 31 by way of the radio interface R 1 to BS 4, and furthermore transmitted to the position register center 7 where the position is registered (signal sequence 505 to 507). Another position register demand issued from the personal station PS 1A located outside the moving object is accepted by the personal base station CS 20 located outside the moving object, and then is sent to the position register center 7, as shown in a signal sequence 508.

On the other hand, in the personal base station CS 20, even when the position register demand issued from PS 1B located outside the moving object (sequence 502), acceptance of this demand is prohibited.

The personal station PS 1B rode on the moving object transmits the position register demand to CS 24 within the moving object for every preselected time, so that CS 24 may confirm that PS 1B gets on the moving object. The personal base station CS 24 within the moving object will make a decision that PS 1B (possessor) gets off the moving object at a time instant when no confirmation is made, and then performs the release process of the position registration.

It should be noted that the position registration of PS 1B within the moving object into only CS 24 within the moving object may be realized as follows: The personal base station CS 24 within the moving object transmits the electromagnetic waves containing such identification that this personal base station CS. 24 is CS within the moving object, and the personal station 1B designated by the using location designation key transmits the position register demand only to CS for receiving the electromagnetic waves containing the above-described identification.

As previously described, the position registration restriction related to the moving object is possible when any one of PS 1B within the moving object and CS 24 within the moving object can recognize that PS 1B is present within the moving object.

Thus, as the method for recognizing whether or not PS 1 is located within the moving object by any one of PS 1 within the moving object and CS 24 within the moving object, other than the above-described method, there are one method for transmitting such an identification signal that PS 1 is present within the moving object to PS 1B with employment of very weak electromagnetic waves capable of covering, for instance, only seats of the moving object; another method for sensing that PS 1B passes through an entrance of the moving object; and further another method for measuring the location of PS 1B by measuring strengths of the electromagnetic waves transmitted from PS 1B at plural points within the moving objects.

Figure 6:
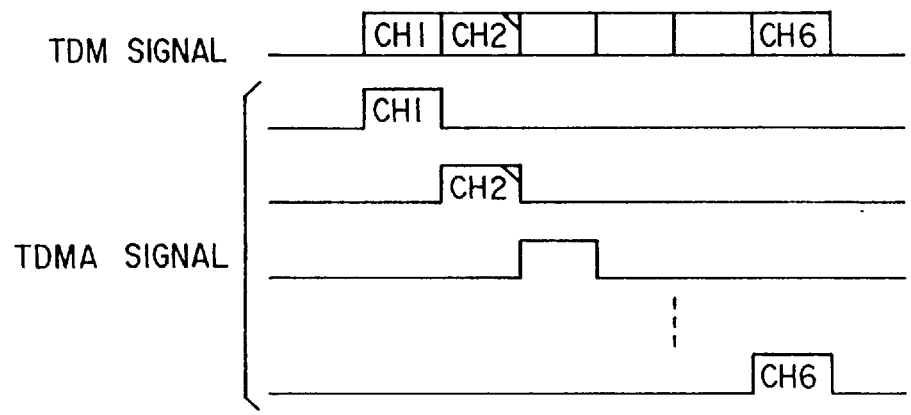
FIG. 6 is an explanatory diagram for representing a signal between MS and BS.
Figure 8:
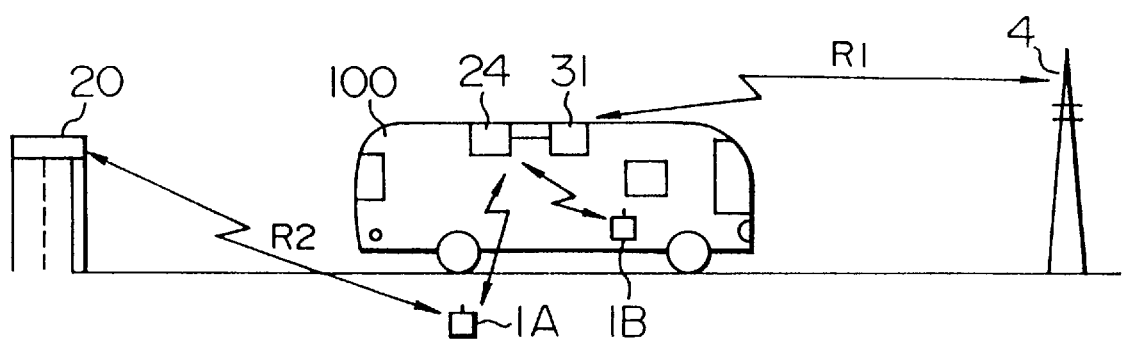
FIG. 8 is an explanatory diagram for schematically showing positional registration of PS located near the moving object.

Referring now to FIG. 6, the mobile station (reference numeral 31 of FIG. 1) within the moving object will be explained.

In the conventional automobile telephone system, there is such a limitation that only one telephone communication line is available between MS 31 within the moving object and the base station at the same time. That is, in the conventional digital cellular telephone system, as shown in FIG. 6, the TDM-TDMA system has been employed as the communication system, in which the telephone communications in the plural channels (plural channels) are available with use of one signal wave with respect to the signal transmission/reception. Then, when a call is made, the respective mobile stations MS select an empty 1 channel from the plural channels CH 1 to CH 6 (see FIG. 6) to perform the telephone communication (CH 2 is used in FIG. 6). As a consequence, since each channel corresponds to 1 line, a single MS can use only 1 line.

However, there are possibilities that the plural lines are required at the same time in such a moving object as a bus and a train where a large number of persons are located. When a plurality of same types of mobile stations MS are prepared for the required number of communication line, this telephone system would have a drawback in cost.

Therefore, in the mobile station MS 31 according to this embodiment, the empty channels are sequentially allocated to the existing calls, if required, so that the telephone communications in the plural lines are realized by employing only one mobile station MS 31.

Figure 7:
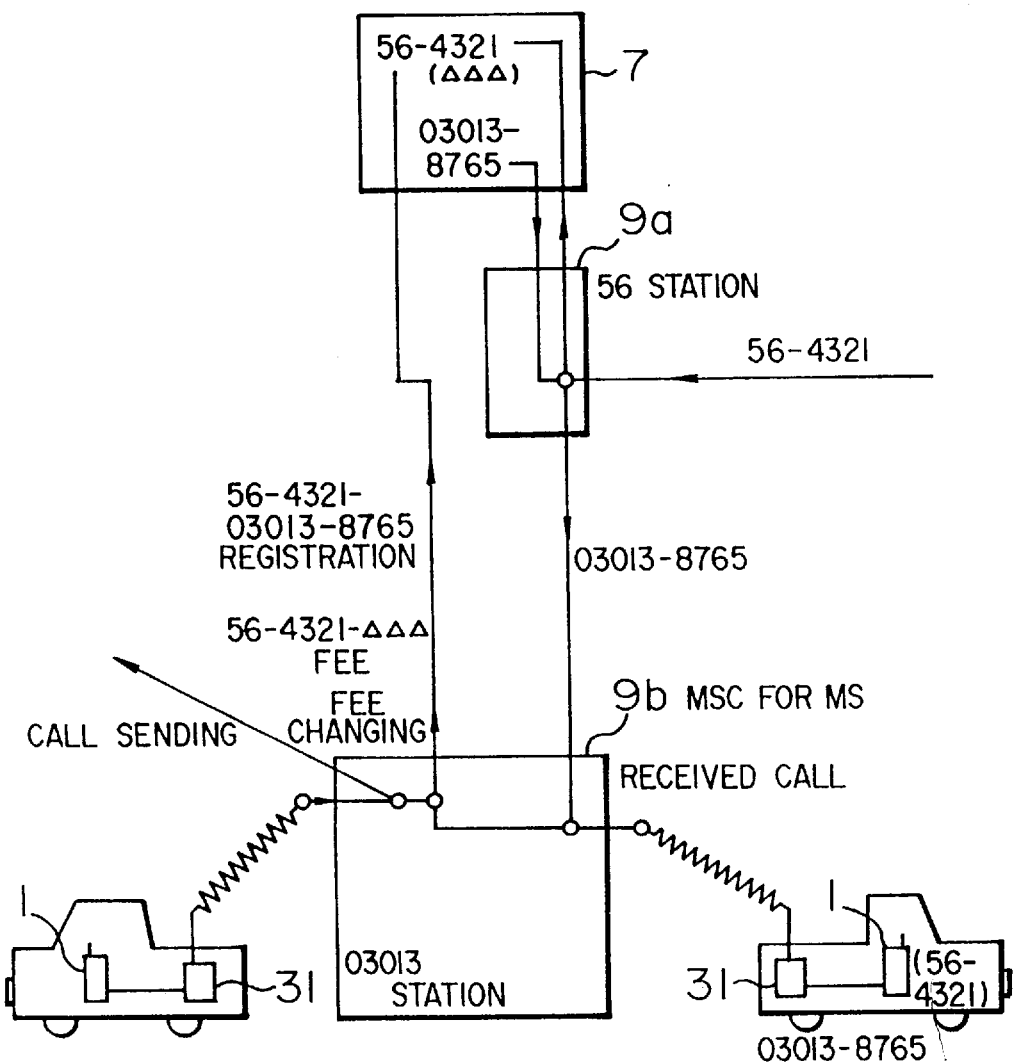
FIG. 7 is an explanatory diagram for showing a process to convent a subscriber number.

Next, a description will now be made of a method for exchanging a call to PS 1 connected to MS 31 with reference to FIG. 7. In this case, it is assumed that PS 1 is directly connected to MS 31 in an one-to-one relationship without being connected via CS 24 mounted on the moving object thereto. First, when the personal station PS 1 is mounted (taken into) on an automobile and the like and is connected to MS 31, both PS 1 and MS 31 combine the subscriber number allocated to PS 1 with the number allocated to MS 31, and the combined number is registered into the position register center 7. Subsequently, the mobile communication switching station MSC 9b for MS may simply process the call made from PS connected to MS 31 as the transmission from MSC by receiving only the number of MS 31. Also in this case, this mobile communication switching station MSC 9b refers to the registration content of the position register center 7, and when both the number of MS 31 as the transmitter end and the subscriber number of PS 1 are registered in the combination form, reports the telephone communication fee to the mobile communication switching station MSC 9a for PS after the telephone communication is accomplished, so that this fee is charged to PS 1 having the registered subscriber number. On the other hand, the mobile communication switching station MSC 9a for PS refers to the registration content of the position register center 7 once PS 1 receives a call. Then, in case that the subscriber number of this PS 1 and the number of MS 31 are registered as a combination, the calling number is converted into the number of MS 31 which has been registered as the combination, and the call is exchanged into MSC 9b for MS. The mobile communication switching station MSC 9b for MS will exchange-process it in a similar manner of the normal exchange process for the call to MS 31. As a consequence, this call is connected to PS 1.

As previously described in detail, according to the present invention, such a personal communication system can be provided that various sorts of services are selectively available by using a single personal station PS, depending upon various conditions.

What is claimed is:

1. A personal communication system comprising:

a plurality of personal stations;

a fixed personal base station, fixed on the ground, said fixed personal base station relays a call issued from a personal station to a mobile communication switching device;

a mobile personal base station, installed on a moving object, said mobile personal base station relays the call issued from the personal station to a mobile station;

a mobile station which relays the call relayed by said mobile personal base station to a base station via a radio interface;

a base station connected to the mobile communication switching device;

a position register center which supervises positions of respective personal stations;

a mobile communication switching device which switches calls among said respective personal stations in accordance with a supervising content of said position register center;

a transmitter installed in the moving object, said transmitter transmits an identification signal with employment of very weak electromagnetic waves capable of covering the inside of the moving object; and a register which registers a position of said personal station via only said mobile personal base station into said position register center when said PS receives said very weak electromagnetic waves.

* * * * *